(12) United States Patent
Morita et al.

(10) Patent No.: US 12,471,614 B2
(45) Date of Patent: Nov. 18, 2025

(54) METHOD FOR ENHANCING ATHLETIC ABILITIES

(71) Applicant: Asahi Group Holdings, Ltd., Tokyo (JP)

(72) Inventors: Hiroto Morita, Moriya (JP); Chie Kano, Moriya (JP); Teppei Nakamura, Moriya (JP); Makiko Onishi, Moriya (JP)

(73) Assignee: Asahi Group Holdings, Ltd., Tokyo (JP)

( * ) Notice: Subject to any disclaimer, the term of this patent is extended or adjusted under 35 U.S.C. 154(b) by 633 days.

(21) Appl. No.: 17/442,378

(22) PCT Filed: Mar. 13, 2020

(86) PCT No.: PCT/JP2020/011262
§ 371 (c)(1),
(2) Date: Sep. 23, 2021

(87) PCT Pub. No.: WO2020/203195
PCT Pub. Date: Oct. 8, 2020

(65) Prior Publication Data
US 2022/0192245 A1   Jun. 23, 2022

(30) Foreign Application Priority Data

Mar. 29, 2019 (JP) ................. 2019-067505

(51) Int. Cl.
  *A23L 33/125* (2016.01)
  *A61K 31/724* (2006.01)
  *A61P 3/02* (2006.01)

(52) U.S. Cl.
  CPC .......... *A23L 33/125* (2016.08); *A61K 31/724* (2013.01); *A61P 3/02* (2018.01)

(58) Field of Classification Search
  CPC ....... A23K 20/163; A23L 2/52; A23L 33/125; A61K 31/724; A61P 21/06; A61P 3/02; A61P 9/00
  See application file for complete search history.

(56) References Cited

U.S. PATENT DOCUMENTS

| 2018/0085419 A1 | 3/2018 | Miyazaki et al. |
| 2020/0297020 A1 | 9/2020 | Fukuda et al. |

FOREIGN PATENT DOCUMENTS

| CN | 104544086 A | 4/2015 |
| CN | 104544086 | * 10/2016 |
| JP | 2007-131609 A | 5/2007 |
| JP | 2007-308468 A | 11/2007 |
| JP | 2008-031055 A | 2/2008 |
| JP | 2017-008016 A | 1/2017 |
| JP | 2017-192331 A | 10/2017 |
| WO | WO-2019/069735 A1 | 4/2019 |

OTHER PUBLICATIONS

Tomlinson (Biogerontology, 2016, 17:467-483).*
Yadav (Diabetes, Metabolic Syndrome and Obesity: Targets and Therapy 2017:10, 57-64).*
CN104544086 (Machine English translation done on Sep. 19, 2025).*
Nihei et al., "Dietary α-cyclodextrin Modifies Gut Microbiota and Reduces Fat Accumulation in High-fat-diet-fed Obese Mice", Biofactors, vol. 44, Issue 4, 2018, pp. 336-347.
Search Report and Written Opinion in International Application No. PCT/JP2020/011262 dated Jun. 2, 2020, 7 pages.
Notice of Submission of Publication in JP Application No. 2021-511367 dated Apr. 10, 2024, 13 pages.
Antenucci et al., "Enzymatic Degradation of α- and β-Cyclodextrins by Bacteroides of the Human Colon", J. Agric. Food Chem., vol. 32, No. 6, 1984, pp. 1316-1321.
Extended European Search Report in EP Application No. 20781855.0 dated Nov. 23, 2022, 11 pages.
Comerford et al., "The Beneficial Effects α-Cyclodextrin on Blood Lipids and Weight Loss in Healthy Humans", Obesity, vol. 19, No. 6, Jun. 1, 2011, pp. 1200-1204.
Morita et al., "Bacteroides Uniformis Enhances Endurance Exercise Performance Through Gluconeogenesis", bioRxiv, Mar. 5, 2020, retrieved from the internet https://doi.org/10.1101/2020.03.04.975730, 30 pages.
Office Action in AU Application No. 2020252930 dated Jan. 17, 2025, 4 pages.
Buckley et al., "Dose-Dependent Inhibition of the Post-Prandial Glycaemic Response to a Standard Carbohydrate Meal Following Incorporation of Alpha-Cyclodextrin", Annals of Nutrition & Metabolism, vol. 50, 2006, pp. 108-114.
Communication Pursuant to Article 94(3) EPC in EP Application No. 20781855.0, dated Mar. 13, 2025, 11 pages.
Onishi et al., α-Cyclodextrin Supplemation Improves Endurance Exercise Performance and Reduces Post-exercise Fatigue in Human Males: a Randomized, Double-blind, Placebo-controlled, Parallel-group Study, Bioscience of Microbiota, Food and Health, vol. 44(1), 2025, pp. 80-89.
Onishi et al., a-Cyclodextrin Supplemation Improves Endurance Exercise Performance and Reduces Post-exercise Fatigue in Human Males: a Randomized, Double-blind, Placebo-controlled, Parallel-group Study, Bioscience of Microbiota, Food and Health (Advance Publication), Aug. 28, 2024, 47 pages.
Office Action in TW Application No. 109108403 dated May 28, 2025.

* cited by examiner

*Primary Examiner* — Pancham Bakshi
(74) *Attorney, Agent, or Firm* — MARSHALL, GERSTEIN & BORUN LLP

(57) ABSTRACT

The present invention addresses the problem of providing a novel composition which can make a contribution to athletic ability enhancement. The present invention provides an athletic ability enhancing composition including α-cyclodextrin as an active ingredient. The athletic ability enhancement includes at least one effect selected from among physical strength improvement, anti-fatigue, and fatigue feeling mitigation. In addition, the athletic ability enhancement also includes suppressing an increase in heart rate during exercise. Furthermore, provided is a composition which is for proliferating *Bacteroides uniformis* in the intestinal tract and includes α-cyclodextrin as an active ingredient. In the present invention, α-cyclodextrin is preferably administered in an amount of 0.01 mg/kg body weight to 200 mg/kg body weight per day, and preferably administered for at least seven days.

4 Claims, 5 Drawing Sheets

Specification includes a Sequence Listing.

SEQUENCE LISTING

```
<160> NUMBER OF SEQ ID NOS: 3

<210> SEQ ID NO 1
<211> LENGTH: 23
<212> TYPE: DNA
<213> ORGANISM: Bacteroides uniformis

<400> SEQUENCE: 1
tcttccgcat ggtagaacta tta                                             23

<210> SEQ ID NO 2
<211> LENGTH: 22
<212> TYPE: DNA
<213> ORGANISM: Bacteroides uniformis

<400> SEQUENCE: 2
accgtgtctc agttccaatg tg                                              22

<210> SEQ ID NO 3
<211> LENGTH: 24
<212> TYPE: DNA
<213> ORGANISM: Bacteroides uniformis

<400> SEQUENCE: 3
cgttccatta ggttgttggc gggg                                            24
```

METHOD FOR ENHANCING ATHLETIC ABILITIES

INCORPORATION BY REFERENCE OF MATERIAL SUBMITTED ELECTRONICALLY

The sequence listing, which is a part of the present disclosure, is submitted concurrently with the specification as a text file. The name of the text file containing the sequence listing is "57207_Seqlisting.txt", which was created on Sep. 21, 2021 and is 768 bytes in size. The subject matter of the sequence listing is incorporated herein in its entirety by reference.

TECHNICAL FIELD

The present invention relates to an orally ingestible composition for enhancing athletic abilities, and an orally ingestible composition for allowing *Bacteroides uniformis* to proliferate which can contribute to athletic ability enhancement.

BACKGROUND ART

Conducting activities such as labor and exercise normally requires at least physical strength enough to endure these activities. On the other hand, these activities make fatigue accumulate in the body and degrade the functions of the body. It can be said that in order to conduct activities such as labor and exercise on a daily basis, maintenance/enhancement of physical strength and prevention of/recovery from fatigue are vital.

The physical strength for conducting activities such as labor and exercise includes physical abilities such as muscle strength, endurance, and flexibility, which serve as the basis for activities.

Compositions for enhancement of endurance, prevention of fatigue or recovery from fatigue, or nutritional fortification have been developed so far. For example, Patent Literature 1 describes a composition comprising thioctic acids as active ingredients for endurance enhancement, prevention of fatigue or recovery from fatigue, or nutritional fortification. In addition, Patent Literature 2 describes a basal metabolism enhancer comprising thioctic acids as active ingredients that acts on prevention of or early recovery from fatigue, or enhancement in eagerness of activities. Patent Literatures 1 and 2 also state that cyclodextrins, which are used generally as inclusion agents, may be contained in the compositions as inclusion agents for the active ingredients.

Cyclodextrins are also called cyclic oligosaccharides and have structures in which glucose units are cyclically bound. A cyclodextrin in which 6 glucose molecules are bound is called α-cyclodextrin, a cyclodextrin in which 7 glucose molecules are bound is called β-cyclodextrin, and a cyclodextrin in which 8 glucose molecules are bound is called γ-cyclodextrin. α-cyclodextrin has a characteristic (inclusion effect) of taking another molecule in a hollow portion inside, and is generally utilized for foods as a stabilizer or an emulsifier by utilizing this characteristic. Regarding α-cyclodextrin, Non Patent Literature 1 recently reported that by feeding α-cyclodextrin to obese mice which have been given high-fat diets, it is possible to suppress decreases in total bacterial cell numbers of *Bacteroides, Bifidobacterium*, and *Lactobacillus* in the intestinal tracts of the mice to maintain the gut microbiota, resulting in reductions in accumulation of fat. However, Non Patent Literature 1 does not mention species and strains, which are taxonomic subdivisions of the genus, at all.

CITATION LIST

Patent Literatures

Patent Literature 1: Japanese Patent Application Publication No. 2007-131609
Patent Literature 2: Japanese Patent Application Publication No. 2007-308468

Non Patent Literature

Non Patent Literature 1: BioFactors 2018, Volume 44, Issue 4, 336-347

SUMMARY OF INVENTION

Problems to be Solved by the Invention

An object of the present invention is to provide a novel composition that can contribute to athletic ability enhancement.

Means for Solution of the Problems

The present inventors found that the intake of *Bacteroides uniformis* continuously exhibits a physical strength enhancing effect and/or anti-fatigue effect (see International Publication No. 2019/069735 (PCT/JP2018/035295) (which is an international publication that had not been published at the time of the application of the basic application (Japanese Patent Application No. 2019-067, 505) of the present International Application)). The present inventors then considered based on this finding that *Bacteroides uniformis*, which is known to be one of bacteria forming gut microbiota, might be one of factors that bring a physical strength enhancing effect and/or anti-fatigue effect. In view of this, as a result of conducting earnest studies, the present inventors confirmed that the intake of α-cyclodextrin increased the cell number of *Bacteroides uniformis* in the intestinal tract in the test group of humans which took in α-cyclodextrin and also enhanced the athletic abilities. As a result of such studies, the present inventors completed the present invention.

Specifically, the present invention is configured as in [1] to [8] given below.

[1] A composition for athletic ability enhancement, comprising α-cyclodextrin as an active ingredient.

[2] The composition according to the above [1], wherein the athletic ability enhancement includes at least one effect selected from physical strength enhancement, anti-fatigue, and fatigue feeling mitigation.

[3] The composition according to the above [1], wherein the athletic ability enhancement includes suppression of increase in heart rate during exercise.

[4] A composition for proliferation of *Bacteroides uniformis* in the intestinal tract, comprising α-cyclodextrin as an active ingredient.

[5] The composition according to any one of the above [1] to [4], for oral intake.

[6] The composition according to any one of the above [1] to [4], that is an additive for foods and beverages, a pharmaceutical composition, a feed composition, or a feed additive.

[7] The composition according to any one of the above [1] to [6], wherein α-cyclodextrin is administered in an amount from 0.01 mg/kg body weight to 200 mg/kg body weight per day.

[8] The composition according to any one of the above [1] to [7], that is administered for at least 7 days.

Advantageous Effects of Invention

The present invention is capable of providing a novel composition that contributes to athletic ability enhancement.

DESCRIPTION OF EMBODIMENTS

<Composition for Athletic Ability Enhancement>

The present invention relates to a composition that comprises α-cyclodextrin (αCD) and has an athletic ability enhancing effect. In the present invention, the "athletic ability enhancing effect" means at least one effect selected from "physical strength enhancing effect", "fatigue feeling mitigation", "anti-fatigue", "fatigue resistance enhancing effect", and "suppression of increase in heart rate during exercise". α-cyclodextrin is a non-reducible oligosaccharide and has a cyclic structure, and for this reason, is used as a compound having an inclusion function of taking various substances, for example, functional components in foods into the hollow portion thereof. Specifically, α-cyclodextrin is generally used for the purpose of enhancing the solubility of hydrophobic molecules into water through inclusion of hydrophobic molecules and for the purpose of stabilizing substances that easily react with volatile components, ultraviolet rays, heat, oxygen, and the like through inclusion of the substances by utilizing the inclusion function of α-cyclodextrin. According to the present invention, it is possible to significantly enhance the athletic ability enhancing effect with a composition using α-cyclodextrin alone as an active ingredient. Note that the effects that can be brought by α-cyclodextrin alone have not been revealed well so far.

α-cyclodextrin in the present invention can be obtained, for example, by reacting starch with cyclodextrin glucanotransferase although it is not particularly limited. Alternatively, a commercial product can be utilized as appropriate.

In the present invention, "physical strength" relates to a physical ability that serves as the basis of effect that makes it possible to conduct activities such as labor and exercise, and particularly means a body strength that makes it possible to endure activities such as labor and exercise and makes it possible to continuously conduct these. More preferably, "physical strength" means one or more of the systemic endurance and endurance during aerobic exercise that makes it possible to continuously conduct aerobic exercise. "Systemic endurance" means an ability that makes it possible to move the body for a long period of time, which is also called stamina in general.

In the present invention, "physical strength enhancement" means one or more of enhancing physical strength and facilitating recovery of physical strength, and particularly means one or more of enhancing body strength that makes it possible to endure activities such as labor and exercise and continuously conduct these and facilitating recovery of the body strength, and more preferably means one or more selected from the group consisting of enhancing one or more of the systemic endurance and endurance during aerobic exercise as well as facilitating recovery of one or more of the systemic endurance and the endurance during aerobic exercise. The indices for the systemic endurance and the endurance during aerobic exercise are not limited, but for example, the maximal oxygen consumption, the result of time trial using a fitness bike and the like can be used.

In the present invention, "fatigue" means decrease in body functions as a result of continuously conducting activities such as labor and exercise.

In the present invention, "fatigue feeling" means feeling of realizing the presence of fatigue, and involves discomfort and reduction in eagerness of activities in many cases. General malaise, lassitude, and weakness, which are observed in various diseases, are used almost synonymously with "fatigue feeling".

In the present invention, "anti-fatigue" and "enhancing fatigue resistance" are synonymous, mean one or more of mitigating fatigue, facilitating recovery from fatigue, and preventing fatigue, and preferably mean mitigating decrease in body functions which occurs as a result of continuously conducting activities such as labor and exercise, facilitating recovery from decrease in the body functions, or preventing decrease in the body functions to make the body functions unlikely to decrease. Without limitation, the "anti-fatigue" and the "fatigue resistance enhancing effect" can be evaluated, for example, by the VAS questionnaire, time trial using a fitness bike, the maximal oxygen consumption, or the like.

In the present invention, "fatigue feeling mitigation" means one or more of mitigating feeling of realizing the presence of fatigue, mitigating discomfort and/or decrease in eagerness of activities which occur as a result of continuously conducting activities such as labor and exercise, facilitating recovery from the discomfort and/or decrease in eagerness of activities, and preventing the discomfort and/or decrease in eagerness of activities. Without limitation, the "fatigue feeling mitigating effect" can be evaluated by, for example, the VAS questionnaire or the like.

In the present invention, "heart rate during exercise" indicates an average value of the numbers of beats of the heart per minute (bpm) for a certain period of time while activities such as labor and exercise with a certain intensity are being conducted. The "heart rate during exercise" is also used in calculating the exercise intensity for human. For example, it is generally conducted to set exercising while setting the "heart rate during exercise" to 50 to 80% of the maximum heart rate (the fastest heart rate for each individual) as a barometer for building a healthy body, and the heart rate during exercise is linked to the exercise loading each subject receives during exercise. For this reason, this means that as the heart rate during exercise increases in a subject, the exercise loading the subject receives increases, in turn increasing the hardness the subject feels during exercise.

In the present invention, "suppression of increase in heart rate during exercise" means, for example, that the heart rate during exercise in a subject who has received exercise loading with a certain intensity does not increase as compared with increase in heart rate during exercise in the same subject when the subject received exercise loading with the same intensity in the past, that is, is maintained at a low level. A subject in which increase in heart rate during exercise has been suppressed means that the physical strength and the like of the subject have enhanced and the same exercise intensity for the subject has substantially decreased as compared with the past, which means the hardness the subject feels during exercise also decreases. Hence, for example, in a case where increase in heart rate during exercise in a subject with a certain intensity is suppressed, the subject can lightly and refreshingly conduct exercise with the same intensity and also easily continue activities such as labor and exercise. This makes it possible for a subject to easily get accustomed to exercise as a habit or to enhance the joy during exercise. The indices for the "suppression of heart rate during exercise" are not limited, but, for example, a record of the heart rate during a exercise loading test with a certain intensity and the like can be used.

The amount of α-cyclodextrin contained in the composition of the present invention may vary depending on the formulation or form of the composition, but may normally be set to an amount selected from a range of 1 to 100% by mass, preferably 7 to 47% by mass, and more preferably 17 to 37% by mass relative to the composition. For example, in a case where the composition of the present invention is formulated into the form of tablets having a total amount of 250 mg, the amount of α-cyclodextrin contained in one tablet may be an amount selected from 2.5 to 250 mg, preferably 17.5 to 117.5 mg, and more preferably 42.5 to 92.5 mg.

The subjects (test subjects) to which the composition of the present invention is to be administered or fed include mammals (for example, human, primates (monkey, chimpanzee, and the like), livestock (cow, horse, pig, sheep, and the like), pets (dog, cat, and the like), experimental animals (mouse, rat, and the like)), birds, reptiles, and the like which require one or more of the effects of physical strength enhancement, fatigue feeling mitigation, and anti-fatigue, but are preferably mammals, and are particularly preferably human.

Then, the present invention can give the athletic ability enhancing effect to not only test subjects (for example, humans) having no exercise habit but also humans having certain exercise habits. For example, the test subjects may be humans who conduct exercise with an intensity of 5 METs or more for 30 minutes or more once or more a week. It is possible to enhance athletic ability for such test subjects having moderate exercise habits. In addition, since it is possible to improve fatigue resistance and/or mitigate fatigue feeling during exercise with a middle intensity to a high intensity such as walking, jogging, running, marathon, swimming, cycling, aerobics, tennis, soccer, skiing, and skating and/or after the exercise, the present invention can suppress the accumulation of fatigue as well. Note that the METs (metabolic equivalent of task) is an index for exercise intensity, and 1 MET is equivalent to an oxygen intake of 3.5 ml/body weight kg/min, and is an oxygen requirement necessary for the body to function at the time of rest.

The dosage or intake of the composition of the present invention may vary depending on factors such as the age and body weight of a subject, the route of administration, the number of times of administration or intake, the degrees of one or more of physical strength and fatigue, and any dosage or intake can be employed. For example, in the case of oral administration or intake, the intake of a-cyclodextrin may be 0.01 mg/kg body weight or more, preferably 0.1 mg/kg body weight or more, and more preferably 1 mg/kg body weight or more per day, and the amount of 200 mg/kg body weight or less, preferably 50 mg/kg body weight or less, more preferably 20 mg/kg body weight or less, or 10 mg/kg body weight or less can be administered or taken in once or more times (for example, 2 to 5 times, and preferably 2 to 3 times).

Although the composition of the present invention can exhibit its effects in a trace amount and in a short period of time, there is a tendency that administration or intake over a long period of time allows higher effects to be achieved. Although the athletic ability enhancing effect can be observed by administering or taking in the composition of the present invention for at least 7 days or more, for example, it is more preferable to successively administer or take in the composition of the present invention over a period of 14 days or more, 1 month or more, 2 months or more, 6 months or more, 1 year or more, or longer in accordance with the above-described amount of use.

The composition of the present invention has the athletic ability enhancing effect. Specifically, the composition of the present invention can give the subjects who are administered with or take in the composition the effects of one or more of enhancing and recovering physical strength, particularly one or more of enhancing the body strength that makes it possible to endure labor and exercise and continuously conduct these and facilitating the recovery of the body strength, more preferably, one or more of enhancing one or more of systemic endurance and endurance during aerobic exercise and facilitating the recovery of one or more of the systemic endurance and endurance during aerobic exercise, as compared with those who are not administered with or do not take in the composition. In addition, the composition of the present invention can give the subjects who are administered with or take in the composition the effects of one or more of mitigating fatigue, facilitating recovery from fatigue, and preventing fatigue, and preferably, one or more of mitigating decrease in body functions which occurs as a result of continuously conducting activities such as labor and exercise, facilitating recovery from decrease in the body functions, or preventing decrease in the body functions to make the body functions unlikely to decrease, as compared with those who are not administered with or do not take in the composition. Moreover, the composition of the present invention can give the subjects who are administered with or take in the composition the effects of one or more of mitigating fatigue feeling and mitigating feeling of realizing the presence of fatigue, and preferably, one or more of mitigating discomfort and/or decrease in eagerness of activities which occur as a result of continuously conducting activities such as labor and exercise, facilitating recovery from the discomfort and/or decrease in eagerness of activities, and preventing the discomfort and/or decrease in eagerness of activities, as compared with those who are not administered with or do not take in the composition. Furthermore, the composition of the present invention can give the subjects who are administered with or take in the composition the effects of one or more of suppressing increase in heart rate during exercise, allowing the subjects to lightly and refreshingly conduct exercise, allowing the subjects to easily continue activities such as labor and exercise, and allowing the subjects to easily get accustomed to exercise, and/or, enhancing the joy during exercise, as compared with those who are not administered with or do not take in the composition. Based on these effects, the composition of the present invention has efficacy and effects on nutritional supports and the like in the cases of nutritional fortification, fragile health, physical fatigue, and the like.

<Composition for Proliferation of *Bacteroides uniformis* in the Intestinal Tract>

The present invention also relates to a composition that comprises α-cyclodextrin for allowing *Bacteroides uniformis* in the intestinal tract to proliferate. In test subjects who take in or are administered with α-cyclodextrin, *Bacteroides uniformis* in the intestinal tract significantly increases as compared with before intake. In addition, in the test subjects who take in or are administered with α-cyclodextrin, the athletic ability is enhanced. Hence, increase in the cell number of *Bacteroides uniformis* in the intestinal tract by the intake or administration of the composition of the present invention is considered as one of reasons that the athletic ability can be enhanced.

Here, since intestinal flora (gut flora) is very complicated and is established in a very fine bacterial composition balance, even if the system that can allow only *Bacteroides uniformis* to proliferate in vitro is established, it cannot be said that the system can be employed as it is for *Bacteroides uniformis* in intestinal flora. It has been confirmed that when taken in or administered into the body of a mammal, the composition according to the present invention is actually capable of significantly increasing the cell number of *Bacteroides uniformis* in the intestinal tract of the mammal.

"*Bacteroides uniformis*" in the present invention is publicly known and can be characterized based on publicly-known mycological characteristics described in Bergey's Manual of Bacteriology Vol. 4 (1989) and the like. *Bacteroides uniformis* is an anaerobic gram-negative rod that has a size of about 0.8×1.5 μm, forms no endospore, and has no motility. *Bacteroides uniformis* is a bacterium that normally exists in the intestinal tracts of many mammals including human.

"*Bacteroides uniformis*" to be allowed to proliferate in the present invention is a strain in the intestinal tract of a mammal (for example, human, monkey, chimpanzee, cow, horse, pig, sheep, dog, cat, mouse, rat, or the like), and preferably human.

The composition of the present invention can increase the cell number of any strain classified into *Bacteroides uniformis*. *Bacteroides uniformis* to be increased may be a *Bacteroides uniformis* strain that exists in the intestinal tract of the subject that takes in the composition of the present invention or a *Bacteroides uniformis* strain that the subject has taken in from outside. The *Bacteroides uniformis* strain to be taken in from outside is not particularly limited as long as it is a *Bacteroides uniformis* strain, but includes, for example, ATCC 8492 strain, CCUG 4942 strain, CIP 103695 strain, DSM 6597 strain, NCTC 13054 strain, JCM 5828 strain, CP 3585 strain, and CP 3586 strain. The *Bacteroides uniformis* strain is preferably, JCM 5828 strain, CP 3585 strain, or CP 3586 strain. JCM 5828 strain is a standard strain registered and preserved at RIKEN Bio Resource Center, Microbe Division (3-1-1 Koyadai, Tsukuba, Ibaraki 305-0074). CP 3585 strain and CP 3586 strain were internationally deposited as accession numbers NITEBP-02536 and NITEBP-02537 in the independent administrative agency, National Institute of Technology and Evaluation, Patent Microorganisms Depositary (#122, 2-5-8 Kazusakamatari, Kisarazu-shi, Chiba 292-0818) on Aug. 25, 2017.

*Bacteroides uniformis* in the intestinal tract can be isolated in accordance with a publicly-known method to be observed (Paola Gauffin Canoetal, PLoS One. July 2012, Volume 7, Issue 7, e41079). Specifically, feces, fecal matter, or stool of a mammal is diluted in a solvent, which is then inoculated in a plate medium and cultured under an anaerobic condition, followed by extracting the bacterium from the colony appearing in the medium. As the medium, those described below in detail can be utilized, but it is preferable to use a selective isolation medium that allows *Bacteroides* to be distinguished and selected from the viewpoint of efficiency of isolation (Jap. J. vet. Sci., 36, 93-98 (1974)). After the bacterium thus obtained is confirmed to be a gram-negative *bacillus* through gram staining and microscopic examination, the bacterium selected is analyzed based on the base sequences of 16Sr RNA gene, by which *Bacteroides uniformis* can be identified and cloned. The base sequences of 16Sr RNA gene of *Bacteroides uniformis* are publicly known, and are disclosed, for example, in publicly-known databases such as GenBank, and are registered as NR_040866, AB 050110, AB 510711, and L 16486. For analysis of 16Sr RNA gene, information of these sequences can be utilized. The analysis and identification of 16Sr RNA gene can be conducted based on publicly-known methods such as the quantitative PCR method, the DGGE/TGGE method, the FISH method, the 16Sr DNA cloning library method, the T-RFLP method, the FISH-FCM method, and the base sequence determination method (Biochemistry, vol. 80, No. 5, 421-425. 2008; JNutr. 2004 February; 134(2): 465-72.; Appl. Environ. Microbiol. 64. 3336-3345. 1998; Appl. Environ. Microbiol., 65, 4799-4807, 1999; Appl. Environ. Microbiol., 62, 2273-2278, 1996; Appl. Environ. Microbiol., 64, 3854-3859, 1998).

For example, according to the quantitative PCR method, a primer specific to *Bacteroides uniformis* is fabricated based on the publicly-known base sequence information of 16Sr RNA gene of *Bacteroides uniformis*. PCR reaction is conducted using the primer with DNA extracted from the selected bacterium as a template, and it can be determined whether the bacterium is *Bacteroides uniformis* or not based on the presence or absence of a PCR amplicon with intended size. Design of a specific primer and determination of PCR conditions can be conducted in accordance with a conventional method (BAIO ZIKKEN IRASUTOREITTEDO 3 HONTOU NI FUERU PCR: SAIBOU KOUGAKU BESSHI ME DE MIRU ZIKKEN NO-TO SIRI-ZU; Hiroki NAKAYAMA, Shujunsha Co., Ltd.).

<Optional Additive(s)>

The composition of the present invention may contain an additive such as an excipient, a lubricant, a binder, and a disintegrant normally used in the production of pharmaceutical agents and foods and beverages together with α-cyclodextrin, and may be produced in a formulation or form suitable for the intended route of administration or intake method.

The excipient includes lactose, white soft sugar, D-mannitol, D-sorbitol, starch, pregelatinized starch, dextrin, glucose, corn starch, crystalline cellulose, low-substituted hydroxypropyl cellulose, sodium carboxymethyl cellulose, gum arabic, pullulan, light anhydrous silicic acid, synthetic aluminum silicate, magnesium aluminometasilicate, and the like.

The lubricant includes, for example, sugar esters such as sucrose fatty acid esters and glycerides, hydrogenated oils such as calcium stearate, magnesium stearate, stearic acid, stearyl alcohol, powdered vegetable oils and fats, waxes such as white bees wax, talc, silicic acid, silicon, and the like.

The binder includes, pregelatinized starch, sucrose, gelatin, gum arabic, methyl cellulose, carboxymethyl cellulose, sodium carboxymethyl cellulose, crystalline cellulose, white soft sugar, D-mannitol, trehalose, dextrin, pullulan, hydroxypropyl cellulose, hydroxypropyl Methylcellulose, polyvinylpyrrolidone, and the like.

As the disintegrant, lactose, white soft sugar, starch, carboxymethyl cellulose, filtration, salting-out, solvent precipitation, solvent extraction, distillation, immunoprecipitation, polyacrylamide gel electrophoresis, isoelectric focusing, dialysis, recrystallization, and the like may be selected as appropriate and used in combination.

In addition, additives normally used in the production of pharmaceutical agents and foods and beverages, that can be utilized for the composition of the present invention include various oils and fats (for example, vegetable oils such as soybean oil, corn oil, safflower oil, and olive oil, and animal fats and oils such as beef fat and sardine oil), crude drugs (for example, royal jelly, ginseng, and the like), amino acids (for example, glutamine, cysteine, leucine, arginine, and the like), polyhydric alcohols (for example, ethylene glycol, polyethylene glycol, propylene glycol, glycerin, sugar alcohol, for example, sorbitol, erythritol, xylitol, maltitol, mannitol, and the like), natural polymers (for example, gum arabic, agar, soluble corn fiber, gelatin, xanthan gum, casein, gluten or gluten hydrolysate, lecithin, starch, dextrin, and the like), vitamins (for example, vitamin C, vitamin B complex, and the like), minerals (for example, calcium, magnesium, zinc, iron, and the like), dietary fibers (for example, mannan, pectin, hemicellulose, and the like), surfactants (for example, glycerides, polysorbates, and the like), purified water, forming aids (tricalcium phosphate and the like), fluidity improving agents (tricalcium phosphate and the like), diluents, stabilizers, tonicity agents, pH adjusters, buffering agents, humectants, solubilizers, suspending agents, colorants, flavoring agents, odorants, flavors, antioxidants, sweeteners, taste components, acidulants, and the like.

<Optional Other Active Ingredients>

The composition of the present invention may contain another component that is publicly known to have one or more of the physical strength enhancing effect, the anti-fatigue effect, and the fatigue feeling mitigation, in addition to α-cyclodextrin, which is an active ingredient. Such another component includes, but is not limited to, taurine, glutathione, carnitine, creatine, coenzyme Q10, glucuronic acid, glucuronolactone, guarana extract, theanine, γ-aminobutyric acid (GABA), capsaicin, capsiate, allicin, vitamins (vitamins B1, B2, B6, B12, C, E, and the like), various organic acids (citric acid and the like), flavonoids, polyphenols, catechins, caffeine, and the like.

In addition, the composition of the present invention is used to allow *Bacteroides uniformis* to proliferate, but the composition may contain *Bacteroides uniformis* or a treated product thereof as another active ingredient. *Bacteroides uniformis* that can be utilized in the present invention can be cultured and collected using a normal culture medium and culture conditions that can culture the bacterium.

The culture medium only has to be able to culture *Bacteroides uniformis*, and is not particularly limited. The culture medium may contain, for example, glucose, fructose, galactose, maltose, lactose, cellobiose, sucrose, rhamnose, amygdalin, aesculin, salicin, melibiose, trehalose, L-arabinose, ribose, D-xylose, inulin, raffinose, starch, syrup, or the like as a carbon source, an inorganic ammonium salt such as ammonium sulfate or ammonium nitrate, an organic nitrogen-containing material such as urea, amino acid, meat extract, yeast extract, polypeptone, protein decomposition product, or the like, as a nitrogen source, and magnesium sulfate, monobasic potassium phosphate, potassium tartrate, zinc sulfate, magnesium sulfate, copper sulfate, calcium chloride, iron chloride, manganese chloride, or the like as an inorganic salt. It is possible to utilize a publicly-known culture medium (for example, NBGT medium, BL medium, GAM medium, or the like) suitable for the culture of *Bacteroides uniformis*. The culture medium is preferably a liquid medium, but a solid medium or a semi solid medium obtained by adding agar or gelatin may be used as necessary. The culture can be conducted under an anaerobic condition at a temperature of 20° C. to 50° C., preferably 25° C. to 45° C., and more preferably 35° C. to 37° C. The "anaerobic condition" only has to be an environment with oxygen low enough to allow *Bacteroides uniformis* to proliferate, and the anaerobic condition can be achieved, for example, by using an anaerobic chamber, an anaerobic box, or a closed vessel or culture vessel in which a deoxidizer is placed.

The culture can be conducted in accordance with any form such as a static culture, a shake-culture, or a tank culture. In addition, the culture time is not particularly limited but may be, for example, 3 hours to 7 days.

After the culture, the cultured product obtained may be used as it is, or *Bacteroides uniformis* may be purified or partially purified from the cultured product to be used.

The purification or partial purification of the bacterial cells from the cultured product can be conducted by using any means, and can be conducted, for example, by using centrifugation, filtration, or the like.

*Bacteroides uniformis* used in the present invention may be wet bacterial cells or dry bacterial cells.

In the present invention, a treated product of *Bacteroides uniformis* can also be utilized. The "treated product" in the present invention includes, for example, a bacterial cell complex of *Bacteroides uniformis*. The bacterial cell complex can be obtained by coating *Bacteroides uniformis* with a coating agent, and can be obtained by a publicly-known treatment. The coating agent includes, for example, polysaccharides such as starch, amylose, cellulose, hemilose, mannan, and chitosan, thickening polysaccharides such as gelatin, gellan gum, locust bean gum, carrageenan, furcelleran, tamarind, and pectin, casein, and proteins such as powdered skim milk.

*Bacteroides uniformis* or a treated product thereof used in the present invention can be used in any form such as a dried product, a frozen product, a water dispersion, or an emulsified product. The dried product can be obtained, for example, by using any drying means such as spray drying, drum drying, vacuum drying, or freeze drying and can be made into a powder form, a granule form, or the like.

<Embodiment(s) of Composition>

The formulation or form of the composition of the present invention is not particularly limited. As a pharmaceutical agent, the formulation or form may be, for example, a formulation such as a tablet, a capsule, a granule, a powder, a dust, a syrup, a dry syrup, a liquid, a suspension, an inhalant, or a suppository, but preferably an oral preparation. A liquid preparation such as a liquid or a suspension may be provided in the state of being capable of being freeze-dried and reserved, and be then used after dissolved and prepared to an appropriate concentration with a buffer solution containing water or saline, and the like. In addition, the composition with a solid formulation such as a tablet may be coated as necessary (for example, a sugar-coated tablet, a gelatin-coated tablet, an enteric-coated tablet, or the like), or may be made into a preparation whose release is controlled, such as a controlled-release preparation, a delayed-release preparation, or an immediate-release preparation by using a publicly-known technique.

The foods and beverages may have, for example, forms of health beverages and foods in the forms of tablet confectionery, tablets, chewable tablets, dusts, powders, capsules, granules, nutritious supplement drinks, and the like (supplements, nutrition supplement foods, health supplement foods, nutritionally balanced foods, and the like), soft beverages, tea beverage, jelly beverages, sports beverages, coffee beverages, carbonated beverage, vegetable beverages, fruit juice beverages, fermented vegetable beverages, fermented fruit beverages, fermented milk beverages (such as yogurt), lactic acid bacteria beverages, milk beverage, powder beverages, cocoa beverages, confectionery (for example, biscuits and cookies, chocolates, candies, chewing gums, tablets), jelly, and the like (not limited to these).

The foods and beverages may be foods with health claims (foods for specified health use (including conditional foods for specified health use), foods with nutrient function claims, foods with functional claims, health foods, beauty foods, and the like, that contain a component having athletic ability enhancing effect.

In addition, the composition of the present invention may be in the forms of not only foods and beverages for human but also feeds or feed additives for livestock, racehorses, pets, and the like.

The following Examples are merely examples of the subject matter disclosed in the Specification and should not be considered to limit the scope of the disclosed subject matter at all.

EXAMPLES

The test subjects and the criteria for selection, the compositions of the test supplements, as well as the test periods and the endpoints in Examples 1 to 3 are as described below.

1. Test Subjects and Criteria for Selection

As test subjects, 21 healthy males at the ages of 20 to 49 who have exercise habits of conducting exercise with an intensity of 5 METs or more for 30 minutes or more once or twice a week and who can continue the exercise habits during the test period as well were selected.

Among the 21 test subjects, 10 test subjects were selected as an α-cyclodextrin (αCD) intake group, and the remaining 11 test subjects were selected as a placebo group. The test subjects themselves were not informed who belonged to which group.

2. Test Supplements

Test Supplements (tablets) having compositions described in Table 1 below were used. One tablet of the test supplements was of about 250 mg.

TABLE 1

| | Test supplement for α-cyclodextrin intake group mg/tablet | Test supplement for placebo group (control food) mg/tablet |
|---|---|---|
| α-cyclodextrin | 66.7 | 0 |
| Maltitol | 162.38 | 229.05 |
| Tricalcium phosphate | 6.45 | 6.45 |
| Hydroxypropylcellulose | 3 | 3 |
| Calcium stearate | 10 | 10 |
| Starch | 1 | 1 |
| Silicon dioxide | 0.5 | 0.5 |

3. Test Period and Endpoint

Each test subject of the αCD intake group and the placebo group was asked to take in 3 tablets of the above test supplements once a day at any timing. That is, each test subject of the α-cyclodextrin intake group was asked to take in about 200 mg of α-cyclodextrin per day.

The intake period for the test supplements was set to 9 weeks, and change in gut flora was evaluated, a questionnaire on fatigue feeling was conducted, and change in travel time was evaluated, before the start of the intake, after 4-week intake, and after 8-week intake. Note that foods and beverages that are said to support sports and training, pharmaceutical products and quasi-pharmaceutical products that have recovery, prevention or amelioration of "fatigue", "tiredness", "physical strength" and/or "lassitude" as the indication and effects, as well as supplements in general (also including foods with functional claims and foods for specified health use) were prohibited to take in for 1 week counted from the date when the test subjects agreed to participate in the test and during the test period.

Example 1: Test on the Effect of Proliferation of *Bacteroides uniformis* in the Intestinal Tract with α-Cyclodextrin A change in the cell number of *Bacteroides uniformis* in the intestinal tract for each test subject was observed. Feces were collected from each test subject to be used for the evaluation, before intake of the test supplements and after 8-week intake.

DNA was extracted from the collected feces by a conventional method, and the absolute number of *Bacteroides uniformis* in the intestinal tract was evaluated by conducting quantification PCR (probe method) with a conventional method using a forward primer, a reverse primer, and a probe targeting a sequence specific to the 16Sr DNA sequence region of *Bacteroides uniformis* with reference to the description of Anaerobe (2011), 17, 64-68, Jia Tong et al.

```
Forward primer sequence:
                                (SEQ ID NO: 1)
5'-TCTTCCGCATGGTAGAACTATTA-3'

Reverse primer sequence:
                                (SEQ ID NO: 2)
5'-ACCGTGTCTCAGTTCCAATGTG-3'

Probe sequence:
                                (SEQ ID NO: 3)
5'-CGTTCCATTAGGTTGTTGGCGGGG-3'
```

Figure 1:
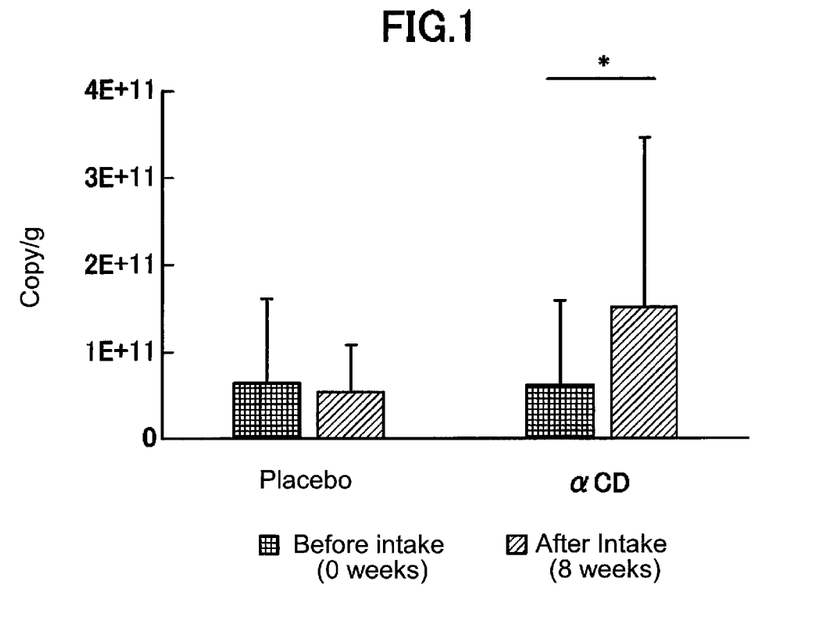
FIG. 1 is a graph showing change in the cell number of *Bacteroides uniformis* in the intestinal tracts of test subjects between before intake of the test supplements and after 8-week intake in Example 1.

The result is shown in FIG. 1. In the α-cyclodextrin intake group, the bacterial cell number of *Bacteroides uniformis* in the intestinal tract was increased to about 2.5 times after 8-week intake (8 w) as compared with before intake (0w). On the other hand, in the placebo group, statistically significant change was not observed in the bacterial cell number of *Bacteroides uniformis* in a comparison between before intake and after 8-week intake. Note that the statistical study on the bacterial cell number before intake and after 8-week intake was conducted in accordance with Wilcoxon signed-rank test, *: p<0.05.

Example 2: Fatigue Feeling Mitigation Test with α-Cyclodextrin

Figure 2:
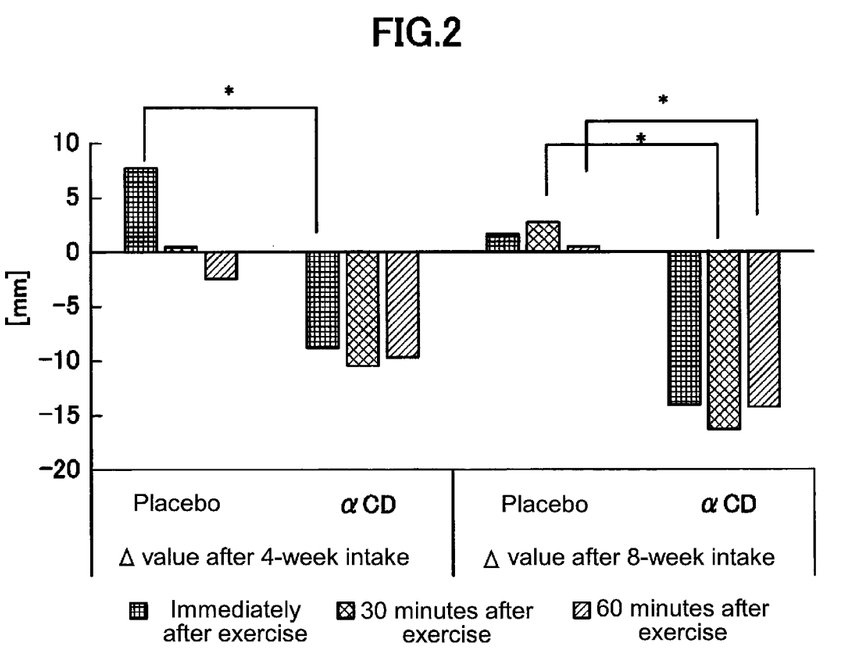
FIG. 2 is a graph summarizing changes in general fatigue feeling with time obtained by conducting a VAS (Visual Analogue Scale) questionnaire regarding fatigue immediately after loading, 30 minutes after loading, and 60 minutes after loading, after the test subjects were subjected to exercise loading using Aerobike (trade mark) before intake of the test supplements, after 4-week intake, and after 8-week intake in Example 2. The significant test between the placebo group and the α-cyclodextrin (αCD) intake group regarding general fatigue feeling was conducted by Student's t-test.

The test subjects were subjected to exercise loading (load intensity: at an intensity of 45% of the maximum exercise loading intensity of each test subject for 50 minutes) using Aerobike (trade mark) (manufactured by KONAMI Sports & Life Col., Ltd., model number AEROBIKE-75XLIII), before intake of the test supplements, after 4-week intake, and after 8-week intake. In the present Example, the maximum exercise loading intensity indicates the weight (W) of the pedals immediately before exhaustion was reached in an incremental load test in which the load was increased by 15 w every one minute, which was conducted in advance. Regarding fatigue, a VAS (Visual Analogue Scale) questionnaire was conducted based on the VAS testing method for fatigue feeling established by Japanese Society of Fatigue Science, immediately after loading, 30 minutes after loading, and 60 minutes after loading, to investigate change in fatigue feeling with time. The items of the questionnaire were "general fatigue feeling", "fatigue feeling of the legs", "tension of the legs", "general lassitude", and "difficulty in breathing", and the "best state (0 mm)" and the "worst state (100 mm)" in each item were based on criteria shown in Table 2. In each intake group, the amounts of change in measured value were evaluated after 4-week intake and after 8-week intake based on the measured value before intake. As a result, in the α-cyclodextrin intake group, the general fatigue feeling after the exercise significantly decreased in each intake period as compared with the placebo group. The significant test between the placebo group and the α-cyclodextrin (αCD) intake group for the general fatigue feeling was conducted by Student's t-test, and the result of the test was summarized as a graph in FIG. 2 (*: p<0.05). In addition, the results for the items "fatigue feeling of the legs", "tension of the legs", "general lassitude", and "difficulty in breathing" were summarized in Table 3. In Table 3, the significant difference was studied by paired t-test for a comparison with before intake of αCD, and the significant test between the placebo group and the α-cyclodextrin (αCD) intake group was conducted by Student's t-test. As seen from Table 3, in the α-cyclodextrin intake group, the scores, particularly after 8-week intake, significantly decreased (that is, the fatigue feeling was mitigated), as compared with before intake. In addition, it was suggested that in the α-cyclodextrin intake group, the fatigue resistance was also improved, particularly after 8-week intake, as compared with before intake.

TABLE 2

| Items of VAS questionnaire | Best state (0 mm) | Worst state (100 mm) |
|---|---|---|
| General fatigue feeling | Best feeling with no tiredness at all | Worst feeling with complete exhaustion to such an extent that the test subject cannot do anything |
| Fatigue feeling of the legs | Best state with no tiredness at all | Worst state with complete exhaustion to such an extent that the test subject cannot move the legs |
| Tension of the legs | Best state with no tension feeling at all | Worst state with complete tension to such an extent that the test subject cannot move the legs |
| General lassitude | Best state with no lassitude at all | Worst state with lassitude feeling to such an extent that the test subject does not want to move at all |
| Difficulty in breathing | Best state with no difficulty in breathing at all | Worst state with difficulty in breathing to such an extent that the test subject does not want to move at all |

TABLE 3

| Item | Test Supplement group | Measurement time | Before intake | After 4-week intake | After 8-week intake (mm) |
|---|---|---|---|---|---|
| Fatigue feeling of the legs | Placebo | Immediately after exercise | 66.771 ± 15.852 | 72.182 ± 12.717 | 65.864 ± 18.122 |
| | | 30 minutes after exercise | 45.563 ± 22.338 | 44.110 ± 13.730 | 41.552 ± 19.345 |
| | | 60 minutes after exercise | 40.101 ± 22.222 | 35.464 ± 20.213 | 34.003 ± 23.541 |
| | αCD | Immediately after exercise | 53.304 ± 25.421 | 60.911 ± 21.493 | 54.009 ± 23.092 |
| | | 30 minutes after exercise | 42.045 ± 25.730 | 38.002 ± 21.474 | 28.636 ± 21.115 ** |
| | | 60 minutes after exercise | 34.945 ± 26.504 | 31.167 ± 20.034 | 22.603 ± 21.310 * |
| Tension of the legs | Placebo | Immediately after exercise | 63.936 ± 19.899 | 67.400 ± 12.992 | 65.487 ± 19.618 |
| | | 30 minutes after exercise | 44.166 ± 20.980 | 43.625 ± 12.265 | 41.788 ± 20.179 |
| | | 60 minutes after exercise | 37.278 ± 18.337 | 34.296 ± 20.536 | 34.328 ± 25.684 |
| | αCD | Immediately after exercise | 59.341 ± 24.644 | 58.542 ± 25.137 | 55.137 ± 24.253 |
| | | 30 minutes after exercise | 41.674 ± 26.128 | 38.015 ± 21.098 | 26.662 ± 21.491 ** |
| | | 60 minutes after exercise | 33.394 ± 26.250 | 29.904 ± 19.297 | 22.193 ± 22.240 |
| General lassitude | Placebo | Immediately after exercise | 51.356 ± 19.544 | 61.823 ± 14.713 | 55.805 ± 24.215 |
| | | 30 minutes after exercise | 38.956 ± 20.885 | 38.492 ± 19.330 | 37.685 ± 18.584 |
| | | 60 minutes after exercise | 30.585 ± 21.667 | 30.269 ± 22.093 | 31.967 ± 22.320 |
| | αCD | Immediately after exercise | 51.306 ± 20.273 | 41.464 ± 17.587 ## | 39.053 ± 21.314 * |
| | | 30 minutes after exercise | 39.689 ± 21.542 | 27.436 ± 16.724 * | 24.728 ± 21.853 * |
| | | 60 minutes after exercise | 30.096 ± 20.702 | 20.932 ± 16.099 | 17.754 ± 19.279 * |
| Difficulty in breathing | Placebo | Immediately after exercise | 41.344 ± 18.837 | 49.640 ± 24.270 | 41.107 ± 26.652 |
| | | 30 minutes after exercise | 20.165 ± 19.244 | 24.285 ± 22.645 | 21.400 ± 16.593 |
| | | 60 minutes after exercise | 19.090 ± 19.142 | 20.579 ± 21.571 | 21.148 ± 18.360 |
| | αCD | Immediately after exercise | 44.516 ± 19.027 | 30.597 ± 21.390 * | 29.033 ± 20.173 ** |
| | | 30 minutes after exercise | 22.702 ± 23.028 | 17.727 ± 15.300 | 16.498 ± 18.581 * |
| | | 60 minutes after exercise | 16.882 ± 18.668 | 16.907 ± 16.405 | 12.228 ± 15.335 |

Average value±standard deviation
Evaluated with "0 mm" as "best state" and "100 mm" as "worst state".
There is significant difference as compared with before intake (*p<0.05, **p<0.01: paired t-test)
There is significant difference as compared with placebo group (#p<0.05, ##p<0.01: Student's t-test)

Example 3: Athletic Ability Enhancement Test with α-Cyclodextrin (Exercise Performance Test)

In order to evaluate change in exercise performance due to the intake of α-cyclodextrin (αCD), the test subjects were asked to pedal for 10 km using SPIN CYCLE (manufactured by Fujimori Co., Ltd., model number FBS-101) after the break of 60 minutes after the exercise of the fatigue feeling mitigation test described in Example 2 was conducted, before intake of the test supplements, after 4-week intake, and after 8-week intake to measure travel time. The load intensity was set to a value that can be set in SPIN CYCLE and is close to a load amount of 45% of the maximum exercise loading intensity for each test subject. The travel time was significantly shortened after 4-week intake of αCD, as compared with the time of the same group before intake, and further, was significantly shortened after 8-week intake of αCD, as compared with the time of the same group before intake and the time of the placebo group after 8-week intake. The result is summarized as a graph in FIG. 3. For a comparison with before intake of αCD, the significant difference was studied by paired t-test, and the significant test between the placebo group and the α-cyclodextrin (αCD) intake group was conducted by Student's t-test (*: p<0.05, **p<0.01).

Figure 3:
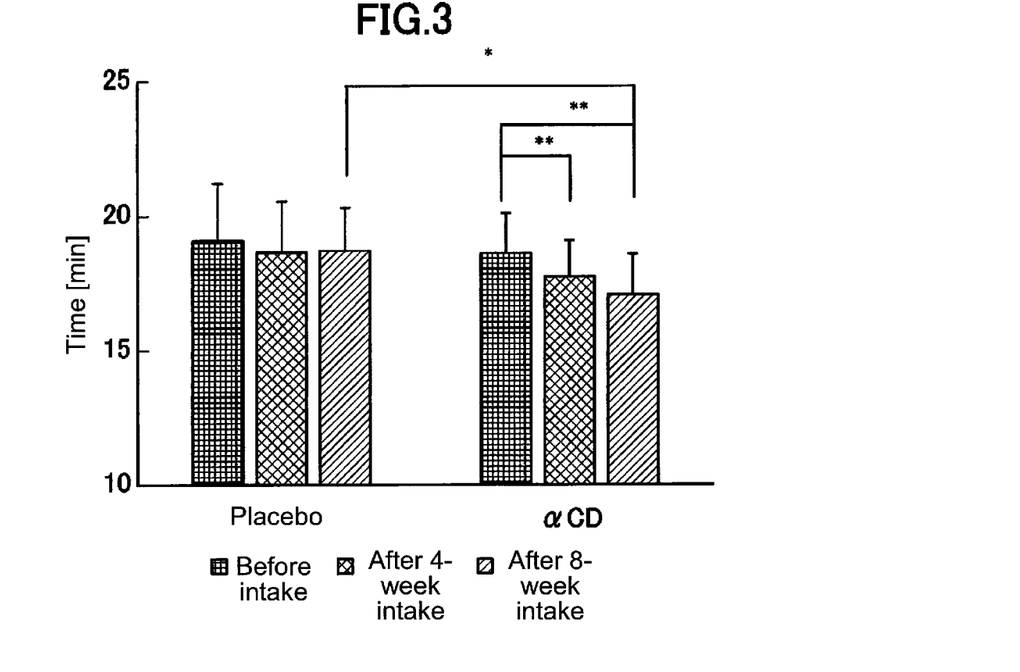
FIG. 3 is a graph summarizing changes in exercise performance due to the intake of α-cyclodextrin (αCD) obtained by asking the test subjects to pedal for 10 km using SPIN CYCLE after the break of 60 minutes after the exercise of the fatigue feeling mitigation test was conducted, before intake of the test supplements, after 4-week intake and after 8-week intake to measure times in Example 3. The significant test between the placebo group and the α-cyclodextrin (αCD) intake group was conducted by Student's t-test. In addition, for a comparison of before intake of α-cyclodextrin (αCD) with after 4-week intake of α-cyclodextrin (αCD) and after 8-week intake, the significant difference was studied by paired t-test.

From the result of FIG. 3, it was found that the intake of α-cyclodextrin contributed to not only fatigue feeling mitigation but also enhancement of the physical strength, particularly enhancement of the systemic endurance and the endurance during aerobic exercise. In addition, the result of FIG. 3 indicated that the intake of α-cyclodextrin also contributed to enhancement of the fatigue resistance.

Data of Examples 1 to 3 supported that the intake of α-cyclodextrin contributed to enhancement of athletic ability.

Next, the test subjects and the criteria for selection, the compositions of the test supplements, as well as the test period and the endpoint in Examples 4 to 6 were set as described below.

1. Test Subjects and Criteria for Selection

As the test subjects, 86 healthy males at the ages of 20 to 49 who have exercise habits of conducting exercise with an intensity of 5 METs or more for 30 minutes or more once or twice a week and who can continue the exercise habits during the test period as well were selected.

Among the 86 test subjects, 43 test subjects were selected as an α-cyclodextrin (αCD) intake group, and the remaining 43 test subjects were selected as a placebo group. The test subjects themselves were not informed who belonged to which group.

2. Test Supplements

Test Supplements (tablets) having compositions described in Table 4 below were used. One tablet of the test supplements was of about 600 mg.

TABLE 4

| | Test supplement for α-cyclodextrin intake group mg/tablet | Test supplement for placebo group (control food) mg/tablet |
|---|---|---|
| α-cyclodextrin | 250 | 0 |
| Maltitol | 300.1 | 550.1 |
| Tricalcium phosphate | 15.4 | 15.4 |
| Hydroxypropylcellulose | 15 | 15 |
| Calcium stearate | 18 | 18 |
| Starch | 1 | 1 |
| Silicon dioxide | 0.5 | 0.5 |

3. Test Period and Endpoint

Each test subject of the αCD intake group and the placebo group was asked to take in 4 tablets of the above test supplements once a day at any timing. That is, each test subject of the α-cyclodextrin intake group was asked to take in about 1000 mg of α-cyclodextrin per day.

The intake period for the test supplements was set to 8 weeks, and the heart rate during exercise was measured, before the start of the intake, after 4-week intake, and after 8-week intake to evaluate change in heart rate. In addition, a questionnaire on fatigue feeling was conducted before the start of the intake of the test supplements and after 8-week intake, and change in travel time was evaluated. The test subjects were asked to live during the test period like before the test. Note that foods and beverages that are said to support sports and training, pharmaceutical products and quasi-pharmaceutical products that have recovery, prevention or amelioration of "fatigue", "tiredness", "physical strength" and/or "lassitude" as the indication and effects, as well as supplements in general (including foods with functional claims and foods for specified health use) were prohibited to take in for 1 week counted from the date when the test subjects agreed to participate in the test and during the test period.

Figure 4:
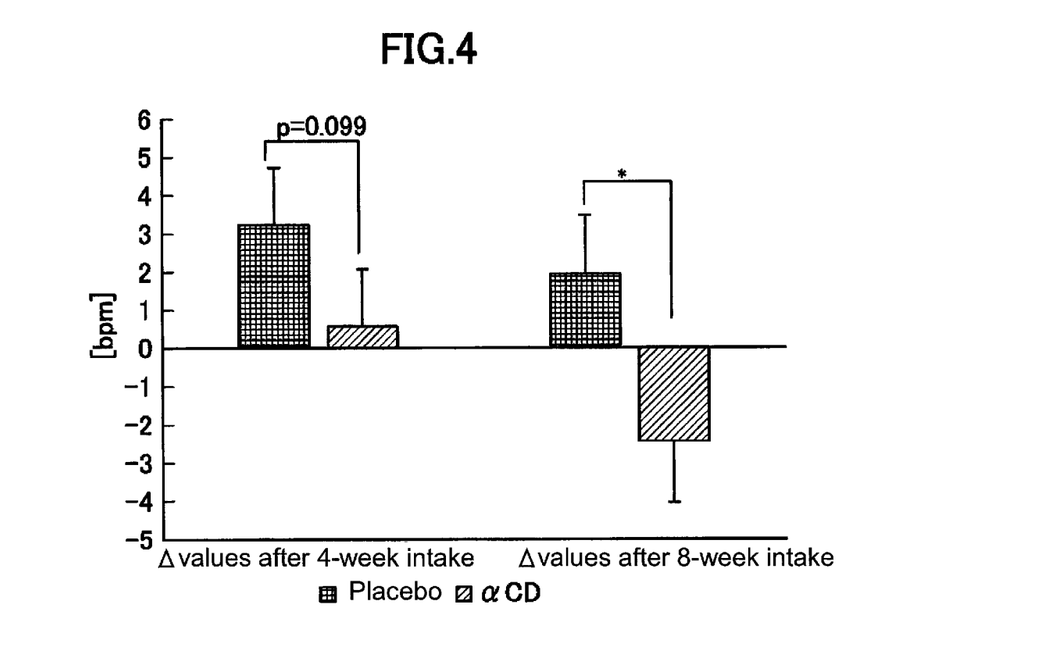
FIG. 4 is a graph summarizing changes in average heart rate for 10 minutes immediately before the end of exercise, after 4-week intake and after 8-week intake based on before intake, obtained by subjecting the test subjects to an exercise loading test (load intensity: at an intensity of 55% of the maximum exercise loading intensity of each test subject for 50 minutes) using Aerobike (manufactured by KONAMI Sports & Life Col., Ltd., model number AEROBIKE-75XLIII) before intake of the test supplements, after 4-week intake, and after 8-week intake in Example 4. The significant test between the placebo group and the α-cyclodextrin (αCD) intake group was conducted by using analysis of covariance (ANCOVA) with a numerical value before intake as a covariate (*: $p<0.05$).

Example 4: Test on Suppression of Increase in Heart Rate During Exercise with α-Cyclodextrin The test subjects were subjected to an exercise loading test (load intensity: at an intensity of 55% of the estimated maximum exercise loading intensity of each test subject for 50 minutes) using Aerobike (trade mark) (manufactured by KONAMI Sports & Life Col., Ltd., model number AERO-BIKE-75XLIII) before intake of the test supplements, after 4-week intake, and after 8-week intake. The estimated maximum exercise loading intensity in the present Example indicates the maximum exercise loading intensity (the weight (W)) of the pedals) calculated from the heart rate during exercise by a program incorporated in Aerobike. The estimated maximum exercise loading intensity was measured in advance for each test subject. The heart rate during exercise loading test was recorded every 1 minute by using an ear sensor. Values of change (A values) after 4-week intake and after 8-week intake based on the value before intake in average heart rates for 10 minutes immediately before the end of the exercise (that is, from 40 minutes after the start of the exercise to the end of the exercise) were evaluated. As a result, the heart rate in the α-cyclodextrin (αCD) group after 8-week intake was significantly lower than that of the placebo group (FIG. 4). Note that, there was a tendency that at the stage after 4-week intake, the heart rate was lower in the α-cyclodextrin (αCD) group than the placebo group (FIG. 4). The significant test between the placebo group and the α-cyclodextrin (αCD) intake group used the analysis of covariance (ANCOVA) with the value before intake as the baseline (*: $p<0.05$).

The heart rate during exercise indicates the average value of heart rate for a certain period of time during exercise, is used for calculating the exercise intensity, and is linked to an exercise loading applied by the exercise. The fact that the intake of α-cyclodextrin reduced the heart rate during exercise of the test subject means that the exercise loading is mitigated for the test subject. That is, it was suggested from the result of the present Example that the intake of α-cyclodextrin enhanced the athletic ability, suppressed an increase in heart rate during exercise, and further reduced the hardness felt during exercise.

Example 5: Fatigue Feeling Mitigation Test with α-Cyclodextrin

Figure 5:
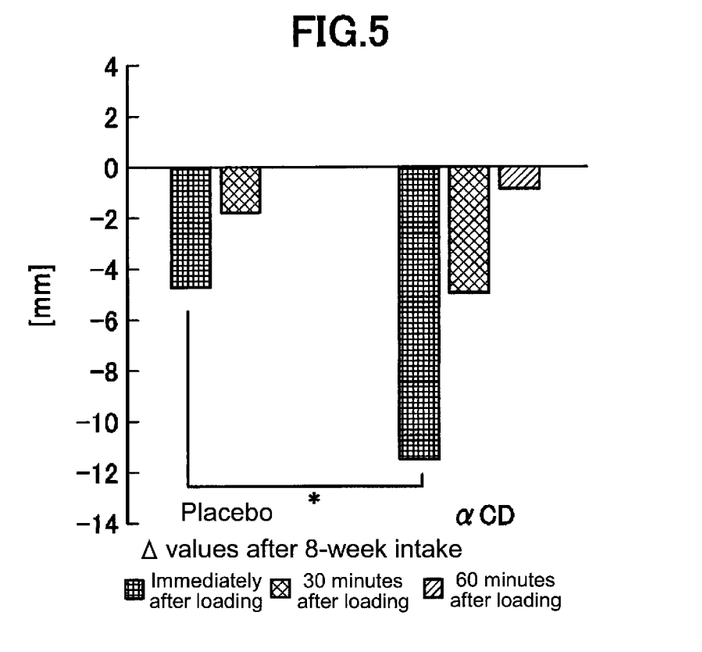
FIG. 5 is a graph summarizing changes in general fatigue feeling with time obtained by conducting a VAS (Visual Analogue Scale) questionnaire regarding fatigue immediately after loading, 30 minutes after loading, and 60 minutes after loading, after the test subjects were subjected to exercise loading using Aerobike (trade mark) before intake of the test supplements and after 8-week intake in Example 5. The significant test between the placebo group and the α-cyclodextrin (αCD) intake group for general fatigue feeling was conducted by Student's t-test.

The test subjects were subjected to exercise loading (load intensity: at an intensity of 55% of the estimated maximum exercise loading intensity of each test subject for 50 minutes) using Aerobike (trade mark) (manufactured by KONAMI Sports & Life Col., Ltd, model number AERO-BIKE-75XLIII), before intake of the test supplements and after 8-week intake. In the present Example, the estimated maximum exercise loading intensity indicates the maximum exercise loading intensity (the weight (W) of the pedals) calculated from the heart rate during exercise by a program incorporated in Aerobike. The estimated maximum exercise loading intensity was measured in advance for each test subject. Regarding fatigue, a VAS (Visual Analogue Scale) questionnaire was conducted based on the VAS testing method for fatigue feeling established by Japanese Society of Fatigue Science, immediately after loading, 30 minutes after loading, and 60 minutes after loading, to investigate change in fatigue feeling with time. The item of the questionnaire was one item "general fatigue feeling", and the "best state (0 mm)" and the "worst state (100 mm)" were based on criteria shown in Table 5. Values of change (A values) of measured values after 8-week intake based on the measured values before intake in each intake group were evaluated. As a result, the general fatigue feeling immediately after exercise in the α-cyclodextrin intake group after 8-week intake significantly decreased as compared with that of the placebo group (FIG. 5). The significant test between the placebo group and the α-cyclodextrin (αCD) intake group for general fatigue feeling was conducted by using Student's t-test (*: $p<0.05$).

TABLE 5

| Item of VAS questionnaire | Best state (0 mm) | Worst state (100 mm) |
|---|---|---|
| General fatigue feeling | Best feeling with no tiredness at all | Worst feeling with complete exhaustion to such an extent that the test subject cannot do anything |

Figure 6:
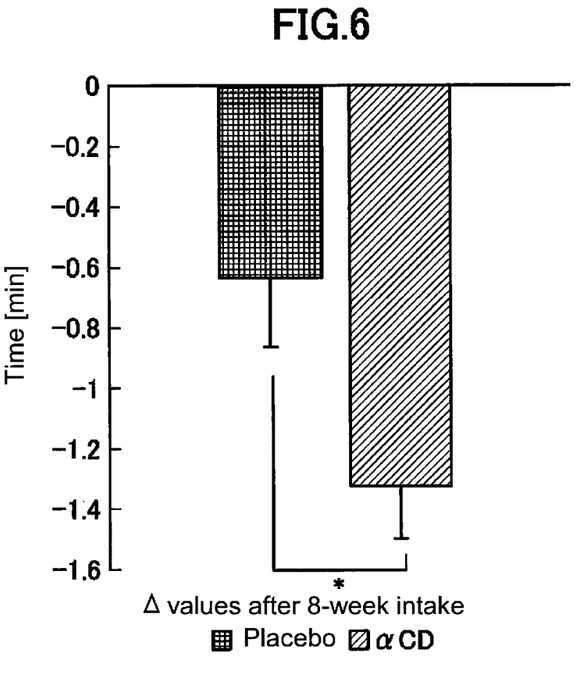
FIG. 6 is a graph summarizing changes in exercise performance due to the intake of α-cyclodextrin (αCD) obtained by asking the test subjects to pedal for 10 km using SPIN CYCLE after the break of 60 minutes after the exercise of the fatigue feeling mitigation test in Example 5 was conducted, before intake of the test supplements and after 8-week intake to measure times in Example 6. The significant test between the placebo group and the α-cyclodextrin (αCD) intake group was conducted by using analysis of covariance (ANCOVA) with a numerical value before intake as a covariate.

Example 6: Athletic Ability Enhancement Test (Exercise Performance Test) with α-Cyclodextrin In order to evaluate change in exercise performance due to the intake of α-cyclodextrin (αCD), the test subjects were asked to pedal for 10 km using SPIN CYCLE (manufactured by Fujimori Co., Ltd., model number FBS-101) after the break of 60 minutes after the exercise loading test described in Example 5 was conducted, before intake of the test supplements and after 8-week intake to measure travel time. The load intensity was set to a value that can be set in SPIN CYCLE and is closed to a load amount of 45% of the estimated maximum exercise loading intensity for each test subject. A value of change (A value) of the time after 8-week intake based on the time before intake of α-cyclodextrin (αCD) was evaluated. As a result, the time after 8-week intake in the α-cyclodextrin (αCD) intake group was significantly less than that of the placebo group (FIG. 6). The significant test between the placebo group and the α-cyclodextrin (αCD) intake group was conducted by using the analysis of covariance (ANCOVA) with the measured value before intake as a covariate (*: $p<0.05$).

Data of Examples 4 to 6 supported that the intake of α-cyclodextrin contributed to enhancement of athletic ability.

What is claimed is:

1. A method of enhancing athletic ability during exercise, wherein the athletic ability enhancement includes at least one effect selected from physical strength enhancement, anti-fatigue, fatigue feeling mitigation, and suppression of heart rate during exercise, the method consisting of administering α-cyclodextrin to a human subject in need thereof, wherein said α-cyclodextrin is administered one time per day in a total amount from 0.01 mg/kg body weight to 20 mg/kg body weight or less.

2. The method according to claim 1, wherein said α-cyclodextrin is orally administered.

3. The method according to claim 1, wherein said α-cyclodextrin is administered for at least 7 days.

4. The method according to claim 1, wherein the total amount of said α-cyclodextrin administered one time per day is 10 mg/kg body weight or less.

* * * * *